United States Patent [19]

Senatore

[11] Patent Number: 5,303,728
[45] Date of Patent: Apr. 19, 1994

[54] WATER CONSERVATION SYSTEM

[76] Inventor: Donald Senatore, 7390 NW. 5th St., Suite 8, Plantation, Fla. 33322

[21] Appl. No.: 927,462

[22] Filed: Aug. 10, 1992

[51] Int. Cl.$^5$ .............................................. E03C 1/32
[52] U.S. Cl. ...................................... 137/113; 4/665; 137/423
[58] Field of Search ........................ 137/113, 423, 112; 4/665

[56] References Cited

U.S. PATENT DOCUMENTS

| | | | |
|---|---|---|---|
| 3,112,497 | 12/1963 | Call | 4/665 |
| 3,158,193 | 11/1964 | Anderson | 137/113 X |
| 3,318,449 | 5/1967 | Jennings et al. | |
| 3,995,327 | 12/1976 | Hendrick | |
| 4,162,221 | 7/1979 | McCormick | |
| 4,197,597 | 4/1980 | Toms | |
| 4,281,677 | 8/1981 | Hoffman | 137/113 |
| 4,349,436 | 9/1982 | Kaump | |
| 4,358,864 | 11/1982 | Medrano | 4/665 |
| 4,438,536 | 3/1984 | Rivera | 4/665 |
| 4,683,864 | 8/1987 | Bucci | 137/113 X |
| 4,802,592 | 2/1989 | Wessels | 137/423 X |
| 4,924,536 | 5/1990 | Houghton | 4/665 |

FOREIGN PATENT DOCUMENTS

| | | |
|---|---|---|
| 0427213 | 5/1991 | European Pat. Off. |
| 2211620 | 9/1973 | Fed. Rep. of Germany. |
| 3434267 | 3/1986 | Fed. Rep. of Germany. |
| 122326 | 5/1991 | Japan .............................. 4/665 |

OTHER PUBLICATIONS

Publication BOB ® Float Valves & Assemblies, 2 Pages, no date.

*Primary Examiner*—Stephen M. Hepperle
*Attorney, Agent, or Firm*—Herbert L. Lerner; Laurence A. Greenberg

[57] ABSTRACT

A water conservation system for toilets is provided. The system comprises an auxiliary water supply including a storage tank for collecting and storing recycled or gray water and a water line hydraulically connecting the storage tank to a toilet tank. A dual action valve is disposed in the toilet tank. The valve includes a first valve segment connected to the fresh water supply and a second valve segment connected to the water line from the storage tank. One or two floats, which are responsive to the fill level in the toilet tank, open and close the first and second valves. The dual action valve may further include a pilot valve disposed inline between the fresh water supply and the first valve for switching the fresh water supply regardless of whether the first valve is in a closed or open condition. The pilot valve communicates with the water line from the storage tank and is responsive to pressure in the water line.

3 Claims, 2 Drawing Sheets

WATER CONSERVATION SYSTEM

BACKGROUND OF THE INVENTION

1. Field of the Invention

The invention relates to a water conservation system, in which waste water from bath tubs, sinks, washing machines or rain water and the like is used for flushing toilets. In particular, the invention relates to a novel valve combination in a toilet tank.

2. Description of the Related Art

Several systems for limiting fresh water usage by utilizing waste water for flushing toilets have been presented in the prior art. For example, U.S. Pat. Nos. 3,318,449 to Jennings et al. (Water Re-use System); U.S. Pat. No. 4,162,218 to McCormick (Water Reuse System); U.S. Pat. No. 4,197,597 to Toms (Water Recycling with Solids and Foam Removal); U.S. Pat. No. 4,349,436 to Kaump (Grate and Water Recovery System); U.S. Pat. No. 4,358,864 to Medrano (Combination Wash Basin and Toilet Conservation System); U.S. Pat. No. 4,438,536 to Rivera (High Pressure toilet Water Feeder Conservation Tank); U.S. Pat. No. 4,924,536 to Houghton (System of Conserving Water in a Building); U.S. Pat. No. 3,112,497 to Call (Water Conservation System); and U.S. Pat. No. 3,995,327 to Hendrick (Water Saving Toilet Arrangement). Various conservation systems have also been proposed in Europe as shown for instance by European patent application 0 427 213 A1 to N. Schlegel et al., or German published, non-prosecuted applications Nos. 22 11 620 to W. Bech and 34 34 267 to A. Gebert.

Most of the prior art devices require substantial alterations in a conventional toilet system, such as an entirely new toilet tank, additional pumps, several additional water pipes and valves, and/or several additional storage tanks. In other words, the conversion of a conventional, already installed system to a prior art water conservation and reuse system required substantial modifications.

It is accordingly an object of the invention to provide a water conservation system, which overcomes the hereinaforementioned disadvantages of the heretofore-known devices of this general type and which is simple to install, requires only a limited amount of additional piping, which is fully automatic and does not require additional maintenance.

SUMMARY OF THE INVENTION

With the foregoing and other objects in view there is provided, in accordance with the invention, a toilet, comprising a toilet bowl, a flushing water supply tank disposed above the toilet bowl, valve means disposed in the supply tank for filling the supply tank with flushing water from a fresh water source and from a recycled water source; the valve means including (1) a first valve communicating with the fresh water source through a first pipe and being shiftable between a closed and an open position; (2) a second valve communicating with the recycled water source through a second pipe and being shiftable between a closed and an open position, the second valve allowing recycled water to enter the supply tank in the open position; and (3) means for turning off the fresh water source as long as recycled water is available from the recycled water source, regardless of whether the first valve is in the open or closed position.

In accordance with another feature of the invention, the turning-off means are in the form of a pilot valve disposed in-line in the first pipe and communicating with the second pipe for automatically closing the first pipe responsive to pressure in the second line.

With the objects of the invention in view there is also provided, in accordance with a further aspect of the invention, a toilet flushing system, comprising a first water supply line for supplying fresh water for flushing the toilet, a second water supply line for supplying recycled or gray water for flushing the toilet, a dual-action valve hydraulically connected to the first and second water supply lines, the valve comprising means for opening the first and second water supply lines responsive to a requirement for flushing water, monitoring means for sensing an availability of water in the second supply line and for closing the first supply line when water is available at the second supply line.

In accordance with a further feature of the invention, the monitoring means are in the form of a pilot valve connected inline in the first water supply line upstream of the dual-action valve. The pilot valve communicates hydraulically with the second water supply line and remains in a closed position by water pressure in the second water supply line.

This embodiment of the invention ensures that fresh water from the city line is only used for flushing the toilet when the auxiliary storage tank with the recycled water is empty or the line has been closed for some reason or another.

In a further embodiment of the invention there is provided a water conservation system which comprises:

an auxiliary water supply including a storage tank for collecting and storing recycled water and a water line hydraulically connecting the storage tank and the toilet tank;

dual action valve means disposed in the toilet tank, including a first valve segment connected to the fresh water supply, a second valve segment connected to the water line of the storage tank, and float means for opening and closing the first and second valve segments in dependence on a fill level in the toilet tank.

In accordance with a concomitant feature of the invention, the dual action valve means further include a pilot valve disposed between the fresh water supply and the first valve for switching the fresh water supply regardless of whether the first valve is in a closed or open condition, the pilot valve communicating with the water line of the storage tank and being responsive to pressure in the water line.

Other features which are considered as characteristic for the invention are set forth in the appended claims.

Although the invention is illustrated and described herein as embodied in a water conservation system, it is nevertheless less not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DESCRIPTION OF THE PREFERRED EMBODIMENTS

Figure 1:
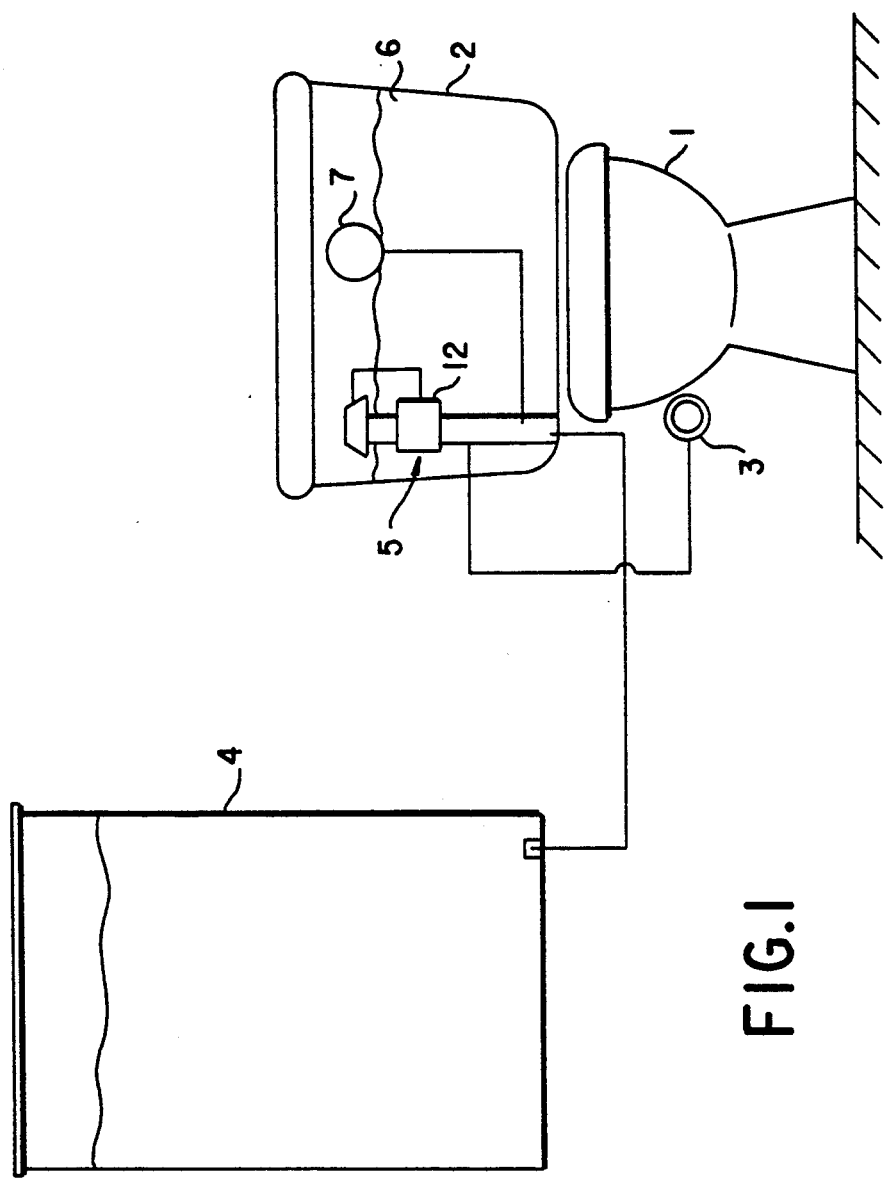
FIG. 1 is a diagrammatic view of a water conservation system according to the invention.

Referring now to the figures of the drawing in detail and first, particularly, to FIG. 1 thereof, there is seen a toilet bowl 1 and a water tank 2 disposed above the bowl. The water tank 2 is hydraulically connected to a city water supply 3. An auxiliary storage tank 4 with flushing water is also hydraulically connected to the tank 2.

A dual action valve 5 automatically determines which of the water sources 3 or 4 is used to fill the water tank 2 and it further determines the fill level to which the water tank 2 is filled with flushing water 6.

The auxiliary storage tank 4 is shown diagrammatically only. Various possibilities are envisioned, some of which have been proposed in the prior art. For example, the tank may be disposed outside the building and rain water may be collected therein. Also, the tank 4 may be disposed adjacent the toilet tank 2, it may be equipped with a removable lid, making it easily accessible, so that dish water or the like could be directly poured into it. Also, the tank 4 may be located at a level above or below the toilet tank 2. In the latter case, the line connecting the auxiliary tank 4 to the toilet tank 2 would be equipped with a pump, which may be automatically triggered by the valve 5. In the alternative, several auxiliary storage tanks 4 could be employed, either connected in series or in parallel. Possible water sources for the auxiliary tank include gray water sources such as dish water from sinks, water from showers and bath tubs, or rain water and the like.

Figure 2:
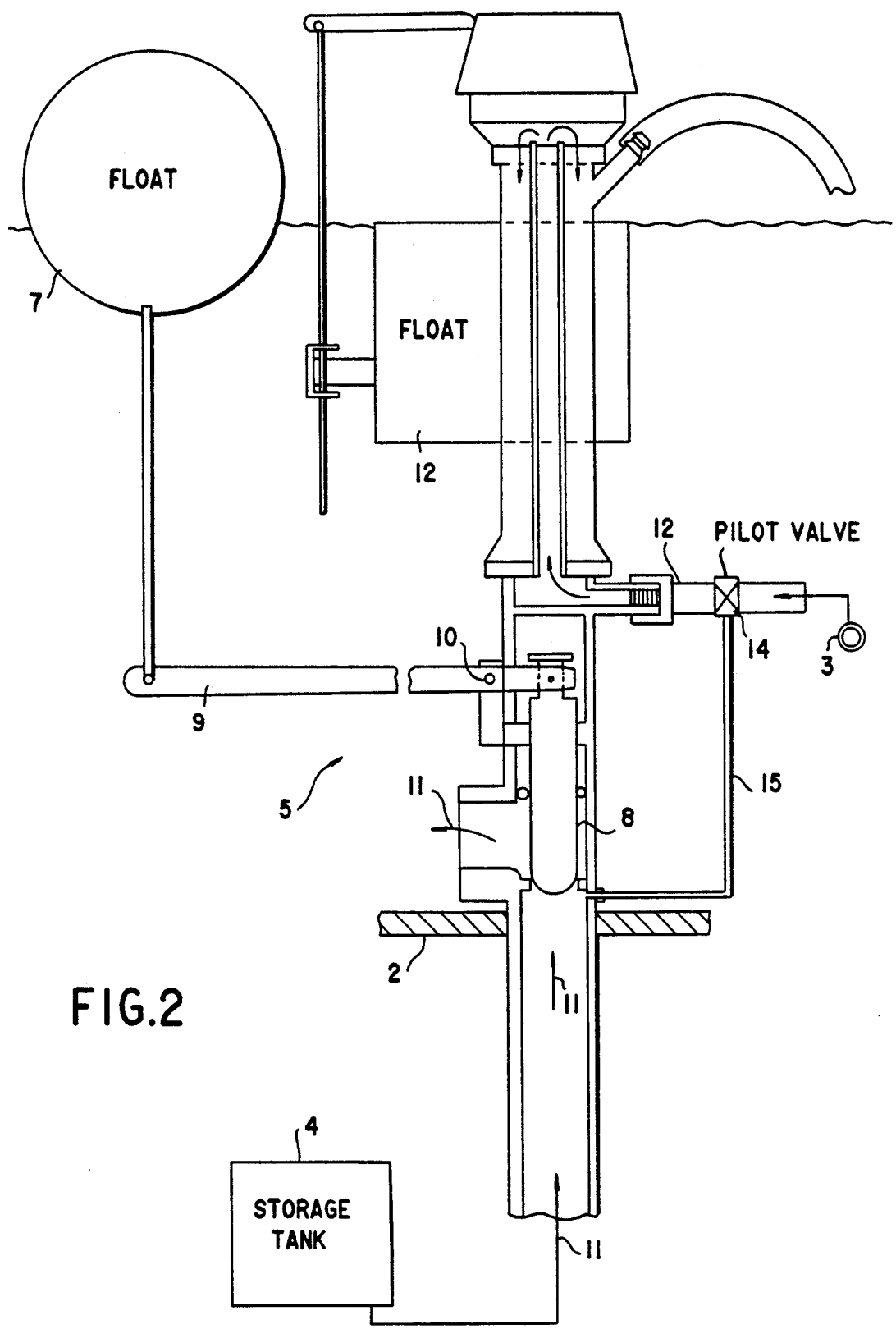
FIG. 2 is a cross-sectional view of a dual action valve according to the invention.

Referring now to FIG. 2, the dual-action valve 5 is disposed in and attached to the toilet tank 2 in a conventional manner. A first float 7 actuates the stop cock 8 of a lower segment of the valve 5. A commercially available valve which, in principle, corresponds to the lower segment of the valve 5 is BOB FLOAT VALVE ASSEMBLY R400 manufactured by Robert Manufacturing. When the water level in the tank 2 is below the desired level (as illustrated), the first float 7 is in a lower position than that shown and the lever 9, which pivots about an axis 10, lifts the stop cock 8. Accordingly, the fluid passage from the storage tank 4 into the toilet tank 2 along the arrows 11 is opened and water is allowed to enter the toilet tank 2. The water from the storage tank 4 continues to enter the toilet tank 2 until it reaches the desired fill level, which is when the float 7 causes the stop cock 8 to close the passage way along the arrows 11.

A second float 12 determines the condition of an upper segment of the valve 5 which fills the tank 2 with city water or fresh water from the supply source 3. A valve which is typical for the upper segment of the valve 5 is the commercially available Fluid Master Model 400A. Similar valves are described in U.S. Pat. Nos. 245,172; 3,495,803; 3,669,138: 4,100,928: 4,327,941 and Canadian Patents Nos. 842,559: 842,560: 925,398: 1,065,731 and 1,130,509. Since such valves are well known in the art, the upper segment of the valve 5 is illustrated only diagrammatically. Water from the line 13 connecting to the city water source 3 is allowed to enter the upper valve segment when the float 12 is at a lower position than that illustrated.

However, in a preferred embodiment of the invention, the line 13 provides water only when a pilot valve 14 is in an open position. The position of the pilot valve 14 is determined by the presence of water pressure from the storage tank 4. In other words, the line 13 will supply water to the toilet tank 2 only if the storage tank 4 is empty, i.e. there is no gray water available to fill the toilet tank 2 through the fluid passage 11.

Pilot valves are generally known in the art and it is not deemed necessary to describe the pilot valve 14 in much detail. A pressure line 15 communicates with the fluid line 11 and, therefore, with the storage tank 4. As long as there is elevated pressure in the pressure line 15, the pilot valve remains closed and the toilet tank 2 will fill up only with waste water from the storage tank 4. When the pressure in the pressure line 15 falls below a given value (which is adjustable on the pilot valve), the pilot valve 14 is allowed to open and the toilet tank 2 fills up with city water, as required in dependence on the float 12.

In the alternative, if no pilot valve is provided, the toilet tank 2 fills up with a mixture of waste water and fresh water. The pipes of the fluid passage 11 as shown have a diameter which is approximately three times that of the fresh water line 13. Accordingly, assuming regular pressure conditions, the tank 2 will fill up at a ratio of three parts gray water to one part fresh water.

In order to avoid permitting water to flow from the toilet tank through the line 11, there may be provided a non-illustrated one-directional membrane which will close when the pressure in the toilet tank 2 is greater than the pressure in the line from the auxiliary storage tank 4.

It is noted that the invention may also be realized with a single valve and a single float. In other words, the fresh water supply 3 could lead into the supply line 11 upstream of the stop cock 8. Upstream of that connection, the supply line 11 would then be equipped with a backflow check valve so that water from the fresh water supply line cannot flow into the storage tank 4 when the pilot valve is open. Naturally, the pressure line 15 would be connected into the line 11 upstream of the check valve, so that the pilot valve would not be responsive to pressure from the water source 3.

I claim:

1. A toilet, comprising a toilet bowl, a flushing water supply tank disposed above said toilet bowl, valve means disposed in said supply tank for filling said supply tank with flushing water from a fresh water source and from a recycled water source;

said valve means including:
- a first valve communicating with the fresh water source through a first pipe and being shiftable between a closed and an open position;
- a second valve communicating with the recycled water source through a second pipe and being shiftable between a closed and an open position, said second valve allowing recycled water to enter said supply tank in the open position; and
- means for turning off the fresh water source as long as recycled water is available from the recycled water source, regardless of whether said first valve is in the open or closed position, said turning-off means being a pilot valve disposed in-line in the first pipe and communicating with the second pipe for automatically closing the first pipe responsive to pressure in the second line.

2. A toilet flushing system, comprising a first water supply line for supplying fresh water for flushing the toilet, a second water supply line for supplying recycled water for flushing the toilet, a dual-action valve hydraulically connected to said first and second water supply lines, said valve comprising means for opening said first and second water supply lines responsive to a requirement for flushing water, monitoring means for sensing an availability of water in said second supply line and for closing said first supply line when water is available at said second supply line, said monitoring means being a pilot valve connected inline in said first water supply line upstream of said dual-action valve, said pilot valve hydraulically communicating with said second water supply line and being retained in a closed position by water pressure in said second water supply line.

3. In a building with a bathroom having a toilet bowl, a toilet tank with water for flushing the toilet, and a fresh water supply for supplying flushing water to the toilet tank, a water conservation system comprising:

an auxiliary water supply including a storage tank for collecting and storing recycled water and a water line hydraulically connecting said storage tank and said toilet tank; dual action valve means disposed in said toilet tank, including a first valve segment connected to said fresh water supply, a second valve segment connected to said water line of said storage tank, and float means for opening and closing said first and second valve segments in dependence on a fill level in said toilet tank, said dual action valve means further including a pilot valve disposed between said fresh water supply and said first valve for switching said fresh water supply regardless of whether said first valve is in a closed or open condition, said pilot valve communicating with said water line of said storage tank and being responsive to pressure in said water line.

* * * * *